United States Patent [19]
Koch et al.

[11] Patent Number: 4,591,688
[45] Date of Patent: May 27, 1986

[54] SYSTEM AND METHOD FOR PROCESSING A WORK PIECE BY A FOCUSSED ELECTRON BEAM

[75] Inventors: Dieter Koch, Stuttgart; Friedemann Noller, Herrenberg, both of Fed. Rep. of Germany

[73] Assignee: Institut für Kerntechnik und Energiewandlung e.v., Fed. Rep. of Germany

[21] Appl. No.: 518,351

[22] Filed: Jul. 29, 1983

[30] Foreign Application Priority Data

Aug. 2, 1982 [DE] Fed. Rep. of Germany ....... 3228846
Nov. 5, 1982 [DE] Fed. Rep. of Germany ....... 3240887

[51] Int. Cl.$^4$ ............................................. B23K 15/00
[52] U.S. Cl. ...................... 219/121 EV; 219/121 ED; 219/121 EM
[58] Field of Search ................. 219/121 ED, 121 EU, 219/121 EV, 121 EM

[56] References Cited

U.S. PATENT DOCUMENTS 4,179,316  12/1979  Connors et al. ......... 219/121 EM X

FOREIGN PATENT DOCUMENTS 3043635  4/1982  Fed. Rep. of Germany ...... 219/121 ED
8202352  7/1982  PCT Int'l Appl. .......... 219/121 EV

OTHER PUBLICATIONS

*Metals Handbook*, vol. 6, 8th Edition, "Electron Beam Welding", ©1971, pp. 547–549.

Primary Examiner—C. L. Albritton
Assistant Examiner—Alfred S. Keve
Attorney, Agent, or Firm—Erwin S. Teltscher

[57] ABSTRACT

A welder utilizes a focussed electron beam which is deflected along the processing path required to weld two pieces together and is also oscillated about the processing path in accordance with a modulation curve. The modulation curve is approximated by a sequence of points. The coordinates of the points in a predetermined coordinate system are read out sequentially from a digital storage and converted to analog signals. The analog signals are subjected to low pass filtering and then applied to the deflection system for the electron beam. The cut-off frequency of the low pass filter is a predetermined multiple of the readout frequency of the digital data. When the velocity of the beam along the modulation curve changes, the cut-off frequency and the readout frequency are adjusted simultaneously. Additionally, the position of the focus and/or the intensity of the electron beam can be varied as the beam traces out the modulation curve. The point-by-point approximation of the modulation curve allows a wide latitude of choice in determining the shape of the curve and the velocity of the electron beam.

30 Claims, 8 Drawing Figures

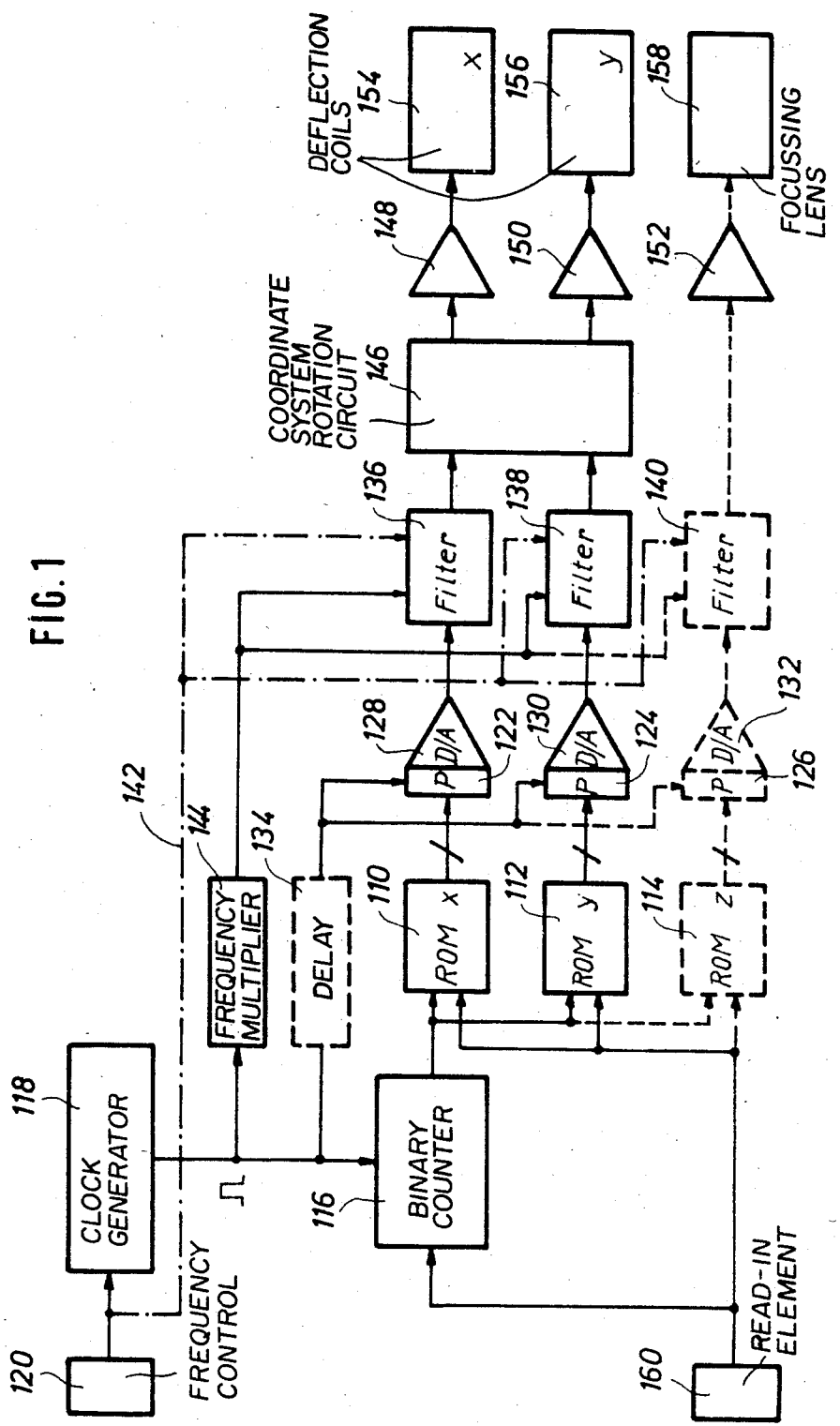

SYSTEM AND METHOD FOR PROCESSING A WORK PIECE BY A FOCUSSED ELECTRON BEAM

FIELD OF THE INVENTION

The present invention relates to a method and system for processing work pieces by means of a focussed electron beam. In particular, operations such as welding, heating, and remelting of the work piece are contemplated.

BACKGROUND OF THE INVENTION

In systems of the above noted type, the electron beam impinges onto the work piece along a predetermined processing path. Additionally, the electron beam is deflected relative to the processing path in accordance with modulation signals superimposed on the main deflection signals.

The term "work piece" as used herein is to be understood to mean two separate parts which make contact along an interface and which are to be welded to one another along the interface.

In conventional systems of this type, the processing path as well as the modulation curve are approximated by analytic functions generated by function generators. These function generators generate only analytic curves such as straight lines, circles, parabolas, etc. Superimposition of these curves then cause the electron beam to be deflected along a zigzag or a spiral path. Additionally, use of the function generators requires that the beam be deflected along its path with a specified velocity. This velocity depends upon the curve to be generated and cannot be adjusted.

Impingement of the electron beam onto the work piece causes its energy to be transferred into the work piece in the form of heat. The material is heated locally above the melting and vaporization temperature. A liquid zone is thus created which has an interface with solid material. Further, a capillary tube of vaporized material is created within the liquid zone, directly at the point of impingement of the electron beam. The interface between the vapor capillary and the liquid zone is determined by the energy balance requirements in the boundary region. During the advance of the work piece, the material in the vicinity of the front surface of the vapor capillary is melted, while that in the region of the trailing or rear surface hardens. The melted material must thus move from in front of the vapor capillary, around the latter, into the region of the rear surface. Measurements indicate that only a very small percentage (less than 2%) of the melt is vaporized in a groove welding process. By far the greatest part flows around the capillary with a speed in the order of magnitude of the speed of advancement of the work piece. The melting and hardening process therefore is subject to the laws of fluid mechanics.

Because of the pressure differences which are created during the welding process between the inside of the vapor capillary and the welding chamber, a vapor flow from the capillary into the chamber is created which can create dynamic effects. A corresponding effect can take place on the lower side of a work piece, if, during groove welding, an abrupt decrease of pressure takes place in the capillary. Such a decrease in pressure tends to cause the rear surface of the capillary to enter into the capillary interior and become directly exposed to the electron beam. This material is then vaporized by the electron beam, causing a pressure increase and a further movement of the phase interface. This in turn causes the formation of spikes, that is the formation of irregular sharp piping which decreases the fatigue strength of the work piece. For groove welds, an irregular formation of the welding bead results, in conjunction with a large spatter formation. The stronger the capillary boundary under these dynamic conditions, the higher the pressure differences, and the greater the spikes.

These effects take place in particular if the electron beam is not caused to oscillate around the processing path. Whether more lobe-shaped or trumpet-shaped capillaries are formed depends upon the focussing of the beam. The lobe-shaped capillaries with a narrow neck tend to create spatter on the side of the upper bead, while the trumpet-shaped capillaries with a pointed base tend to create them on the lower side, if groove welding takes place in the downward direction.

Oscillation of the electron beam along a modulation curve relative to the processing path causes the cross section of the capillary to increase and to be more uniform throughout its length. Thorough investigations of electron beam welding processes have shown that the structure of a weld is greatly influenced by micromovement of the electron beam during the welding process; that is the quality of the weld varies considerably with changes in the shape of the modulation curve, the velocity along the processing path, and the velocity of the beam along the modulation curve. The optimum modulation for an individual case can generally only be determined empirically, taking into consideration the material to be processed and the geometric dimensions in the region of the gap to be welded. With the presently available analytic function generators, such an optimization can be carried out only within very narrow bounds.

SUMMARY OF THE INVENTION

It is an object of the present invention to improve the abovedescribed method of processing a work piece by means of an electron beam. In particular, the shape of the modulation curve and the velocity of movement along the curve are to be fully selectable. Thus, in accordance with the present invention, the electron beam is moved step by step along a sequence of points which together form the modulation curve. Preferably, the beam is halted momentarily at each of the points, but is moved continuously along the interpolation path which exists between any two sequential points. The distance between such two sequential points may differ along the modulation curve.

The present invention is based on the fact that a point-by-point approximation of a modulation curve allows a wide range of shapes and velocities to be accommodated. The task of optimal fitting of the modulation curve to the type of material being welded and its geometric dimensions is thus greatly facilitated.

The change in velocity along the curve is accomplished very simply by changing the distance between sequential points. The more points per unit length of modulation curve, the less the velocity of the beam along that portion of the curve.

It is a further object of the present invention to provide apparatus for carrying out the above-described method. Preferably, a digital storage is provided in which digital data signifying the coordinates of the individual points is stored. This data is read out sequentially, converted into analog currents or voltages, and then applied to the deflection coils or plates. In either case, the coordinates of the individual points are determined by the amplitudes of the analog signals. The analog signals may be filtered by a filter having a cut-off frequency which, preferably, is a multiple of the read-out frequency, before application to the deflection system.

It is further possible to vary the position of the focus and/or of the intensity of the beam along the modulation curve. Data determining the position of the focus and/or the intensity of the beam can be read out sequentially from the digital storage similarly to the readout of the coordinates. The signals read out from the storage are then also converted to analog signals and used to focus the electron beam and/or control its intensity.

Experiments have shown that oscillating the electron beam at the boundary or interface between the vapor and the liquid zone causes progressive local vaporization effects and, therefore, progressive disturbances in the flow within the melt zone. These disturbances can either hinder or help the flow created by advance of the work piece, depending upon the direction and velocity of the beam. It is therefore proposed that the shape and amplitude of the modulation curve, as well as the direction and velocity of electron beam deflection be matched to the flow conditions in the melt zone. Thus, in accordance with the invention, the modulation curve is approximately mirror symmetrical with respect to the tangent to the processing path, and the electron beam is deflected in directions which are also mirror symmetrical to the tangent.

The apparatus of the present invention includes at least two data storages respectively storing the X and Y coordinates of the points constituting in the modulation curve. The address lines for the storages are connected to the counter outputs of a counter which is controlled by a clock. The storage output lines are connected to the input of a digital/analog converter whose output in turn is connected to the deflection system. If the velocities along the curve are relatively low, a microprocessor can control the readout from the storage.

The data storages are preferably read only memories (ROMs). The newer CMOS-RAMs whose data can be preserved with very little energy from low power batteries are also appropriate.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

FIG. 1 is a block diagram of a circuit for generating the desired modulation curve.

FIGS. 2 (a) and (b) are a schematic top view and a vertical cross section of a work piece being welded by an electron beam; and FIGS. 3 to 7 illustrate a variety of modulation curves.

DESCRIPTION OF THE PREFERRED EMBODIMENT

Figure 2A:
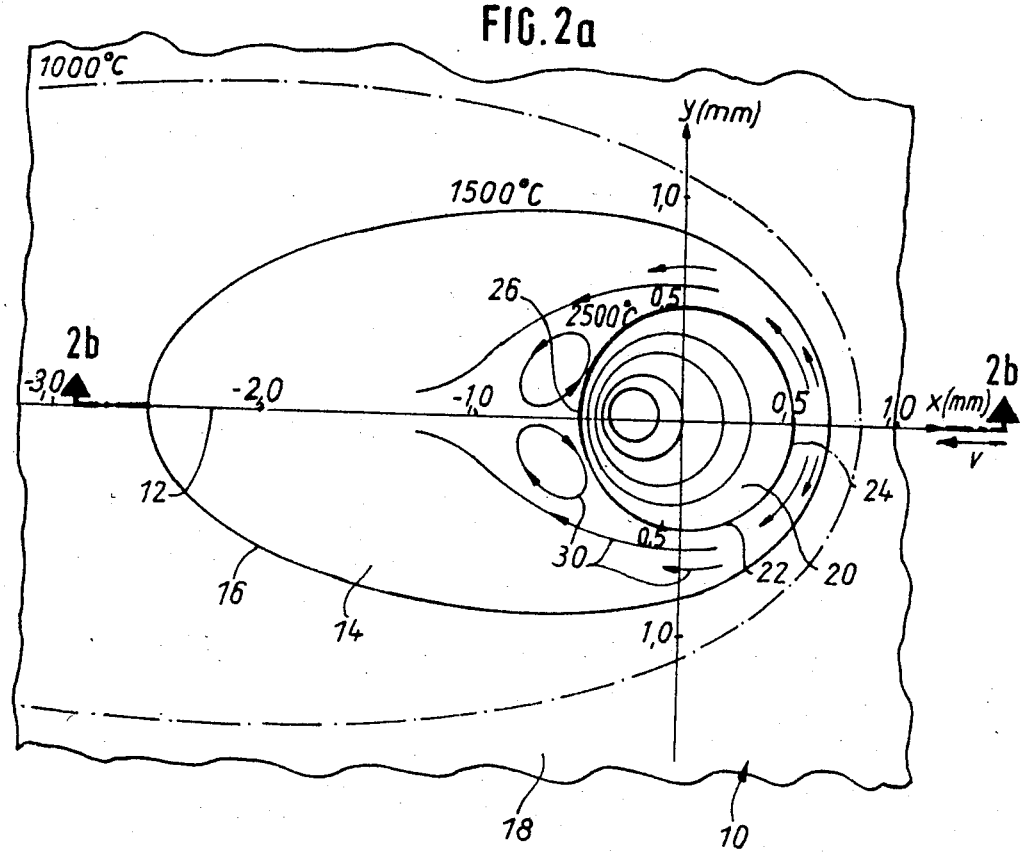

The circuit shown in block diagram form in FIG. 1 is intended as an accessory for an existing electron beam welding machine in which the point of impingement of a focussed electron beam moves along a predetermined processing path relative to the work piece to be welded. It makes no difference whether the work piece is advanced on the beam deflected. In either case, the circuit of FIG. 1 generates a modulation curve along which the electron beam is deflected relative to the processing path during the welding process.

The X and Y coordinates of the modulation curve, stored point by point in digital form in storages 110, 112, may be read out from these in continuous sequential cycles. The storages may be pre-programmed read-only storages or CMOS read and write storages. A binary counter 116 controls the readout of the coordinate values from the storages. Specifically, the counter outputs are connected to the address inputs of storages 110 and 112. The clock input of counter 116 receives the output signal from a clock generator 118. The frequency of the latter may be controlled manually, electronically or mechanically by adjustment of a frequency control 120.

The data output lines of storages 110 and 112 are connected to input buffer storages 122 and 124 of respective digital/analog converters 128 and 130. The converters are controlled by a signal having a frequency corresponding to that of the clock signal, but phase-shifted relative thereto by a time increment which corresponds to the access time of storages 110 and 112. The phase shift can be accomplished by means of a delay unit 134 indicated by dashed lines in the figure, i.e. by a monoflop, or alternatively, by making counter 116 responsive to the leading edge and buffer storages 122 and 124 responsive to the trailing edge of the rectangular clock signals.

The analog output signals of digital/analog converters 128 and 130 are filtered in low pass filters 136, 138, so that a steady transition between points of the modulation curve results. The cut-off frequencies of filters 136 and 138 are to be matched to the then existing clock frequency, so that the interpolation paths between the individual points constituting the curve are traversed at the same speed, independent of the clock frequency.

When a conventional low pass RC filter is used, its resistance or capacitance value can be varied jointly with the clock frequency as illustrated by the dash-dot line 142 in the figure.

For greater economy, a switched capitor filter available as an integrated circuit can be used. These are higher order filters with frequency controlled resistance values. When these filters are used, the cutoff frequency can be controlled directly by the clock frequency if a frequency multiplier 144 is used. This causes a direct coupling between the clock frequency and the cut-off frequency of the filter, the cut-off frequency of the filter being a predetermined multiple, for example 100, of the clock frequency.

An electronic circuit 146 is connected to the output of filters 136 and 138. This circuit allows the coordinate system of the modulation figure to be rotated, preferably in four steps of 90 degrees each. Further, in the case of symmetrical curves, these circuits allow a change in the direction in which the curves are traversed.

If a forward-reverse counter 116 is used, the direction of rotation can be changed even for asymmetrical figures. The direction of readout from the storage is changed by switching the counter from forward to reverse or vice-versa.

These so-generated analog signals are amplified in amplifiers 148 and 150 and then applied to the X and Y deflection spools or coils 154, and 156 of the electron beam welder.

As an additional option, the position of the focus or the intensity of the beam may be varied in dependence on the position of the beam along the modulation curve. The corresponding control values are again stored in a digital storage 114, read out sequentially by the output of counter 116 and changed into analog signals by digital analog converter 126, 132. After the requisite filtering in a low pass filter 140, the signals are applied to an amplifier 152 of a focussing lens 158 or, alternatively, to a circuit controlling the beam intensity.

It has been found that even relatively complicated modulation curves can be represented by a maximum of 256 points. Thus, storages 110, 112 and 114 need eight address lines, which are connected to the output lines of binary counter 116. The number of required data output lines for the storages depends upon the required accuracy of the position of the points of the modulation curve. Generally, eight data lines, creating a resolution of 0.4% are sufficient. For modulation frequencies in the region of between 0.1 to 10 kHz, readout frequencies of the order of magnitude of 10 kHz to 10 MHz, preferably 100 kHz to 1 MHz result. By changing the distance between the points, the velocity along the modulation curve can be varied in accordance with the requirements of the particular task.

A number of different modulation curves may be stored in different address sections of storages of 110, 112 and 114. The different address sections are selected by manually or automatically activated read-in element 160. Element 160 can also simultaneously control the counting range of counter 116, so that this range is matched to each selected modulation curve. This of course is only necessary when the number of points in a curve is different for the various stored modulation curves.

In electron beam welding, the point of impingement A of the focussed electron beam b relative to the work piece 10 travels along a predetermined processing path 12. It makes no difference whether the relative motion between the beam and the work piece is achieved by moving the work piece or the beam. In the following text, v signifies the speed of advancement of the work piece relative to the point of impingement.

The energy of electron beam b is transferred to the work piece in the form of heat. Local heating above the melting and vaporization temperature takes place, so that a liquid or melt zone 14, separated from the solid material 18 by a phase interface 16, is created. Additionally, directly at the point of impingement of the electron beam, a vapor capillary tube 20 having an interface 22 is created within melt or liquid zone 14.

Figure 2B:
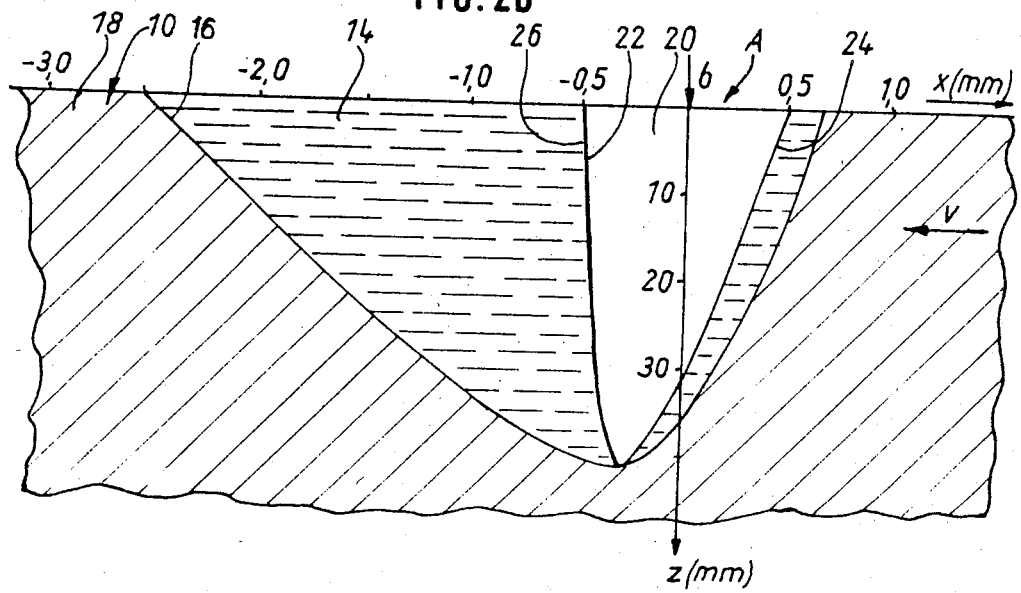
Figure 3:
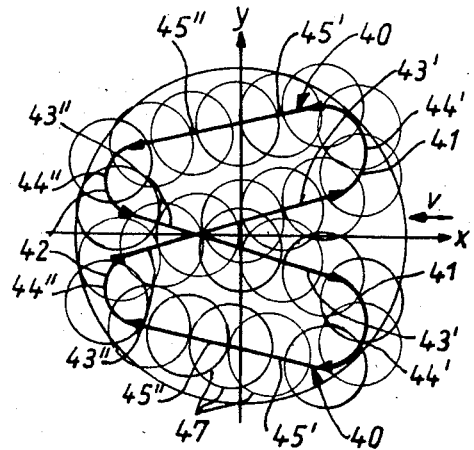

The temperature profile illustrated in FIGS. 2 (a) and (b) is the result of a theoretical investigation of the internal conditions resulting from electron beam welding of a moving work piece in which the electron beam is not deflected relative to the processing path. All conditions were kept constant. FIG. 2 (a) is a top view of the upper surface of the work piece (x-y plane) while in FIG. 2 (b) a vertical cross section along a plane of symmetry (x-y plane) determined by the tangent 12 to the processing path (x axis) and the direction b of the beam (z axis). For the illustrated example, the following data was assumed:

The work piece was assumed to be a fine grained structural steel (22 MnMoMi 55), having a melting temperature of 1500° C., a vaporization temperature of 2500° C. at a pressure of $10^{-6}$ bar, a thermal conductivity of 0.04 W/mmK, and a temperature conductivity of 6 $mm^2s^{-1}$. The electron beam model was a cylindrical beam of 0.5 mm diameter having a homogeneous current density distribution of an accelerating voltage of 150 kV and a beam current intensity of 100 mA. This creates a beam power density of 19 $kW/mm^2$ relative to the impingement surface, approximately what is required for groove welding. The velocity of advancement v of the work piece is assumed to be 10 mm/s.

In FIGS. 2 (a) and (b), the scale divisions along the x and y axes are increased approximately twenty fold relative to the divisions along the z axis, so that the depth dimensions in FIG. 2 (b) are shortened substantially.

The lack of symmetry of the temperature profile relative to the y coordinate results from the relative movement of work piece 10 to impingement point A. During the advancement of the work piece, the material in the region of the front surface 24 of capillary 20 is melted, while the material hardens in the area of the rear surface 26. The melted material thus flows from the front side around the vapor capillary 20 to the rear surface during the welding process. A laminar flow in the melt can be assumed only for relatively small advancement speeds v of less than approximately 1 mm/s. At higher velocities v eddy currents 28 or other turbulences appear in melt zone 14 at the rear surface 26 of the capillary. These cause a reversal of the direction of flow at the boundary of capillary 20. The flow to be expected is indicated in FIG. 2 (a) in the form of flow lines 30.

Oscillation of the electron beam along a modulation curve relative to the processing path causes the cross section of the capillary to increase and to be more uniform throughout its length. Good welding results can only be achieved if the amplitude and the shape of the modulation curve, as well as the velocity and direction with which the beam passes along the curve, are matched to the flow conditions in the melt zone.

Several modulation curves which have been found to be optimal under particular welding conditions are illustrated in FIGS. 3 to 7. The arrows indicate the direction of movement of the beam.

All of the modulation curves have branches 40 which are mirror symmetrical to the x axis, that is to the tangent to the processing curve 12. Further, these branches are traversed by the electron beam in mirror symmetrical directions.

The front surfaces 41 in the direction of movement x, as well as the rear surfaces 42, have curve sections or sectors 43', 43" which are minimally deflected in the y direction namely along a direction transverse to the tangent of the processing path and curve sections or sectors 45', 45" which are more strongly deflected. Each sector 43 is connected to a sector 45 by a connecting sector 44. The connecting sector reverses the direction of movement of the beam along the modulation curve. The direction of movement of the electron beam is selected to match the direction of flow in the adjacent region of the melt zone 14, at least in those sectors of the modulation curve (45', 45") which are more strongly deflected from the processing path. Since the electron beam passes along the modulation curve either continuously or from point to point with continuous movement between the points, care must be taken that those sectors of the modulation curve (43', 43") in which the direction of beam movement is opposite that of the direction of flow are deflected to a lesser extent relative to the processing path. Thus, in the front sector 41 of each modulation curve branch 40, the sector 43' is traced out by the electron beam with a direction of movement having a forward pointing component, while the more strongly deflected sector 45' is traced out with a directional component pointing towards the back.

The optimum shape and direction of movement of the beam in the rearward portion 32 of the modulation curve depend upon whether the flow in the melt zone is laminar or whether eddy currents are formed with the abovedescribed change in direction. For low velocities v, which cause a laminar flow around the vapor capillary, the modulation curves illustrated in FIGS. 3 to 5 have been found advantageous. All of these have branches 40 whose rearward portions 42 have more strongly deflected sectors 45' which are traced out by the electron beam with a directional component pointing backwards and lesser deflected sectors 43' which are traced out with forward pointing directional components.

Figure 6:
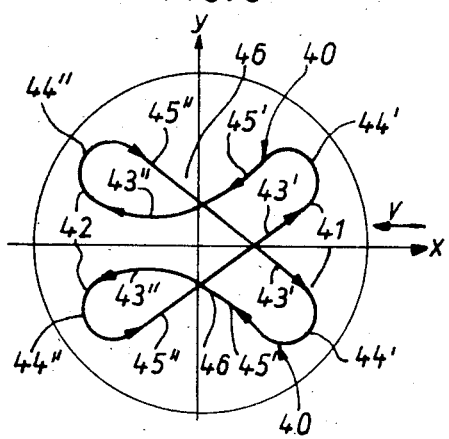
Figure 7:
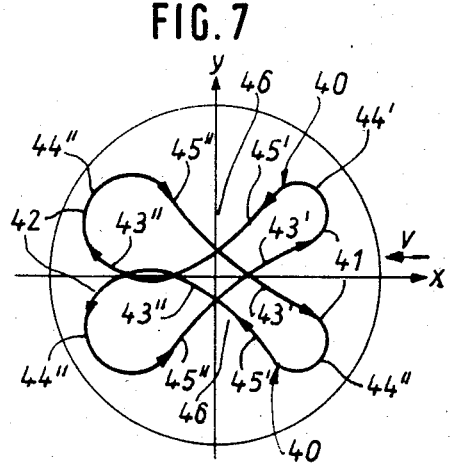

At higher velocities v, for example above approximately 2 mm/s, which caused the creation of eddy currents, better welding results are to be expected with the modulation curves illustrated in FIGS. 6 and 7. In these, the electron beam passes along the lesser deflected sectors 43' in the rearward portion 42 of each branch 40 with a directional component pointing towards the back, and along the more strongly deflected sectors 45'' with a directional component pointing in the forward direction.

Figure 4:
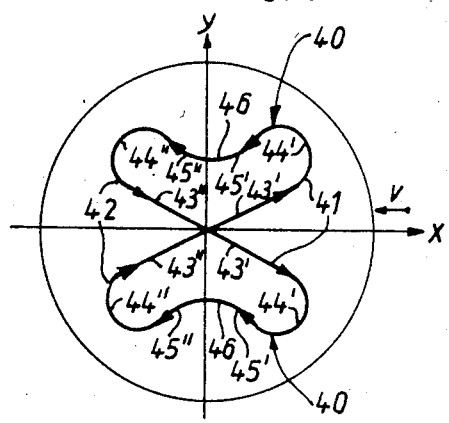
Figure 5:
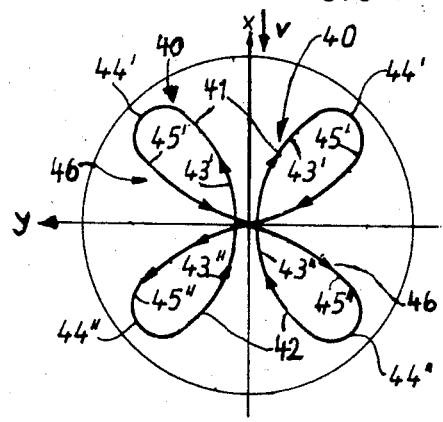

The connecting portions 44', 44'' in the front and in the back portions 41, 42 of modulation curve branches 40 are the regions in which the electron beam generally has its maximum deflection and penetrates most deeply into the adjacent melt zone. These connecting portions are arranged outside of the symmetry line formed by the tangent 12 to the processing path in all embodiments. This causes a maximum reinforcement of the flow with a minimum possible perturbation near the stagnation point at the front surface 24 of capillary 20. The fluid flow can further be reinforced, as illustrated in FIGS. 4 and 7, by separating connecting portions 44', 44'' in the front and rear portions 41, 42 of each modulation curve branch 40 by a portion 46 which is constricted or necked down relative to the processing path.

As mentioned previously, the velocity of the electron beam along the modulation curve should also be matched to the flow conditions in the liquid portion, at least in portions 44', 44'' which represent the maximum deflection. Preferably this velocity should be between one and ten times the flow velocity in the region of the melt zone over which the electron beam passes, or one to twenty times the velocity v with which the work piece advanced. The electron beam can thus trace out the modulation curve with a variable velocity.

Since an analytic representation of the modulation curves illustrated in FIGS. 2 to 7 is not possible, these curves are approximated point by point. The electron beam is moved step-by-step along the modulation curve, the steps being terminated by the discrete points mentioned above. The coordinates of the individual points are read out from the digital storage in sequence, converted to analog currents or voltages and, in this form, applied to the deflection system (FIG. 1). The electron beam may move continuously between two points, the points being at variable distances to create variable beam velocities.

A stable capillary with an increased cross sectional area is achieved if the diameter of the modulation curve is at the most five times, but preferably two to four times the width at half intensity of the electron beam at the impingement point. To illustrate these relationships, the electron beam is shown in the form of small circles 47 having a diameter corresponding to the width at half intensity.

Anisotropic physical relationships in the direction of advancement of the work piece (x axis) and in the direction perpendicular thereto (y axis), can be achieved by allowing the amplitude of the modulation curve in the direction of the tangent and in the direction normal to the processing path to be independently adjustable. Where the x and y coordinates of the points constituting the curve are derived from a digital source, this can easily be achieved by the choice of different proportionality or amplification factors in the x and y directions.

While the invention has been illustrated in preferred embodiments, it is not to be limited to the circuits and structures shown, since many variations thereof will be evident to one skilled in the art and are intended to be encompassed in the present invention as set forth in the following claims.

We claim:

1. In a method of processing a work piece by means of an electron beam impinging on said work piece along a processing path having a predetermined direction of movement, said electron beam further being deflected in accordance with a superimposed modulation curve relative to said processing path, said modulation curve having a front surface and a rear surface, the improvement comprising the steps of moving said electron beam step by step along a sequence of points together constituting said modulation curve, and imparting to said modulation curve mirror symmetry relative to a tangent of said processing path, so that said modulation curve defines a first modulation curve section having a minimal deflection along a direction transverse to the tangent of said processing path, and a second modulation curve section deflected along said transverse direction more strongly than said minimal deflection, and wherein said second modulation curve section has a velocity component in said front surface pointing backwards as seen in a direction opposite to the direction of movement of said electron beam.

2. A method as set forth in claim 1, further comprising the step of momentarily halting said electron beam at each of said points.

3. A method as set forth in claim 1, wherein the path of said electron beam between any two sequential ones of said points constitutes an interpolation path; and wherein said electron beam is continuously deflected along each of said interpolation paths.

4. A method as set forth in claim 1, wherein the distance between sequential ones of said points is a variable distance.

5. A method as set forth in claim 1, wherein said electron beam is deflected by analog signals;

wherein said analog signals are derived from digital signals signifying the coordinates of said points; and wherein digital signals are read out from a digital storage.

6. A method as set forth in claim 5, wherein each of said analog signals has an amplitude corresponding to one of said coordinates;

further comprising the step of filtering said analog signals prior to deflecting said electron beam therewith.

7. A method as set forth in claim 6, wherein said filtering is a low pass filtering having a cut-off frequency varying as a function of the readout frequency of said digital storage.

8. A method as set forth in claim 7, wherein said cut-off frequency is a predetermined multiple of said readout frequency.

9. A method as set forth in claim 8, wherein said cut-off frequency is 100 times said readout frequency.

10. A method as set forth in claim 5, wherein said modulation curve has coordinates in a modulation coordinate system; and
    wherein said modulation coordinate system is rotated while said beam travels along said processing path.

11. A method as set forth in claim 10, wherein said rotation of said modulation coordinate system takes place in dependence on the direction of the tangent to said processing path.

12. A method as set forth in claim 5, wherein the focus of said electron beam is varied while said electron beam travels along said modulation curve.

13. A method as set forth in claim 12, further comprising the step of reading digital control data signifying the position of said focus associated with each of said points from said digital storage;
    converting said digital control data to corresponding analog control signals;
    filtering said analog control signals; and
    controlling the position of said focus of said electron beam in accordance therewith.

14. A method as set forth in claim 5, wherein the intensity of said electron beam is varied while said electron beam passes along said modulation curve.

15. A method as set forth in claim 14, further comprising the step of reading out digital intensity data from said digital storage;
    converting said digital intensity data to corresponding analog intensity signals;
    filtering said analog intensity signals; and
    controlling the intensity of said electron beam in accordance with the so-filtered analog intensity signals.

16. A method as set forth in claim 5, wherein the frequency of said readout from said digital storage is in the 10 kHz to 10 MHz range.

17. A method as set forth in claim 16, wherein said readout frequency is in the 100 kHz to 1 MHz range.

18. A method as set forth in claim 1, wherein a melt zone having a vapor capillary internally thereto is created in the region of impingement of said electron beam;
    wherein said melt zone has a front and rear surface as seen in the direction opposite the direction of movement of said electron beam;
    wherein the motion of said electron beam relative to the point of impingement creates a flow within said melt zone from said front surface to said rear surface around said vapor capillary; and
    wherein said electron beam is deflected by a deflection force having a component corresponding to the direction of flow in the adjacent regions of said melt zone at least in parts of said modulation curve deflected more strongly from said processing path.

19. A method as set forth in claim 18,
    wherein movement of said electron beam in a direction opposite said direction of flow in said melt zone takes place in said portions having said minimal deflection.

20. A method as set forth in claim 19, wherein said electron beam is continuously deflected along said modulation curve.

21. A method as set forth in claim 19, wherein the velocity of said electron beam along said modulation curve is of the same order of magnitude as the velocity of said flow, at least in said more strongly deflected parts of said modulation curve.

22. A method as set forth in claim 21, wherein the more strongly deflected curve section of said modulation curve has maximum deflection portions relative to said processing path; and
    wherein the velocity of said electron beam along said modulation curve is between one and ten times the velocity of said flow in said maximum deflection portions.

23. A method as set forth in claim 22, wherein there is a relative velocity between said work piece and the point of impingement of said electron beam; and
    wherein the velocity of said electron beam along said modulation curve in said maximum deflection portions is between one and twenty times said relative velocity.

24. A method as set forth in claim 18, further including respective connecting sections for connecting said first to said second modulation curve sections; and
    wherein said electron beam moves along said first modulation curve section in said front surface with a velocity having a component pointed forwards as seen in the direction opposite the direction of movement of said electron beam.

25. A method as set forth in claim 24, wherein said electron beam passes along said second modulation curve section in said rear surface with a directional component pointing backwards, and in said first modulation curve section in said rear surface with a directional component pointing forward.

26. A method as set forth in claim 24, wherein said electron beam passes along said first modulation curve section in said rear surface with a directional component pointing backwards, and along said second modulation curve section in said rear surface with a directional component pointing forwards.

27. A method as set forth in claim 24, wherein said electron beam is at maximum deflection when deflected along said connecting sections.

28. A method as set forth in claim 27, wherein lines of symmetry are formed by tangents to said processing path; and
    wherein said connecting sections fall outside of said line of symmetry.

29. A method as set forth in claim 27, wherein said connecting sections in said front and rear surfaces are connected by necked-down portions relative to said processing path.

30. A method as set forth in claim 1, wherein the diameter of said modulation curve is between one and five times the width at half intensity of said electron beam at the point of impingement.

* * * * *